(12) United States Patent
Hasegawa

(10) Patent No.: US 8,027,084 B2
(45) Date of Patent: Sep. 27, 2011

(54) INVERTED MICROSCOPE PROVIDED WITH BLOCKAGE MEMBER FOR PREVENTING SPILLAGE OF FLUID

(75) Inventor: Kazuhiro Hasegawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 608 days.

(21) Appl. No.: 12/135,347

(22) Filed: Jun. 9, 2008

(65) Prior Publication Data

US 2008/0304145 A1 Dec. 11, 2008

(30) Foreign Application Priority Data

Jun. 11, 2007 (JP) ................... 2007-154266

(51) Int. Cl.
*G02B 21/00* (2006.01)
(52) U.S. Cl. ........................ 359/368; 359/507
(58) Field of Classification Search .............. None
See application file for complete search history.

(56) References Cited

U.S. PATENT DOCUMENTS

| 2004/0004758 A1* | 1/2004 | Dietzsch et al. ............. 359/368 |
| 2006/0141613 A1 | 6/2006 | Tsuchiya et al. |

FOREIGN PATENT DOCUMENTS

| EP | 1 677 136 | 7/2006 |
| JP | 5-50413 U | 7/1993 |
| JP | 11271640 A * | 10/1999 |
| JP | 2002-90645 A | 3/2002 |
| JP | 2006-162770 A | 6/2006 |
| WO | WO 02/29469 A1 | 4/2002 |

OTHER PUBLICATIONS

Extended European Search Report dated Dec. 15, 2009 (in English) issued in counterpart European Application No. 08010040.7-2217/2003481.

* cited by examiner

*Primary Examiner* — Arnel C Lavarias
(74) *Attorney, Agent, or Firm* — Holtz, Holtz, Goodman & Chick, P.C.

(57) ABSTRACT

An inverted microscope includes a lens holding mechanism which holds an objective lens arranged under a sample and used to form an observation image of the sample; a focusing mechanism which holds the lens holding mechanism on its upper part and moves the objective lens up and down together with the lens holding mechanism; and a microscope main body which serves as a casing including the focusing mechanism therein, and includes an opening allowing an attachment of the focusing mechanism and the lens holding mechanism in its upper wall surface. A size of the lens holding mechanism in a horizontal plane is larger than a size of an image projected onto the horizontal plane of the opening.

10 Claims, 5 Drawing Sheets

INVERTED MICROSCOPE PROVIDED WITH BLOCKAGE MEMBER FOR PREVENTING SPILLAGE OF FLUID

CROSS-REFERENCE TO RELATED APPLICATIONS

This application is based upon and claims the benefit of priority from Japanese Patent Application No. 2007-154266, filed on Jun. 11, 2007, the entire contents of which are incorporated herein by reference.

BACKGROUND OF THE INVENTION

1. Field of the Invention

The present invention relates to an inverted microscope which generates an observation image of a sample by using an objective lens placed under the sample.

2. Description of the Related Art

Conventionally, an inverted microscope has been widely used for an observation of a sample such as a cell soaked in a culture fluid (cultured cell). In such an observation, a container such as a Petri dish filled with the culture fluid is mounted on a stage, and an objective lens provided under the sample is used to generate an observation image. In a case of performing a time-course observation of a cultured cell for example, it is necessary to replace the culture fluid. On this occasion, there is a problem that the culture fluid is spilled out of the container by mistake on the stage and the spilt fluid intrudes in a main body of the microscope, resulting in polluting an optical member and a mechanism member provided in the main body of the microscope and damaging the function thereof.

In response to this problem, techniques disclosed in Japanese Patent Application Laid-Open No. 2002-90645, Japanese Utility Model Application Laid-Open No. H5-50413, and Japanese Patent Application Laid-Open No. 2006-162770 have been proposed. In an inverted microscope disclosed in the Japanese Patent Application Laid-Open No. 2002-90645, a waterproof sheet which has a hole for securing a path of an observation light at its center is provided over a main body of the microscope. In a state that a vertical motion board which moves an objective lens in the vertical direction is fitted in the hole at the center, a vicinity of circumferential edge part of the hole is settled on the vertical motion board with a rubber band. With this structure, the fluid spilled from the sample and the like is retained on the waterproof sheet or induced to flow down to an outward through the waterproof sheet. Thus, an intrusion of fluid into the main body of the microscope is prevented.

In an inverted microscope disclosed in Japanese Utility Model Application Laid-Open No. H5-50413, a water receiver having a tray shape is provided to a part, located within a main body of the microscope, of a vertical motion unit which moves an objective lens in the vertical direction. Therefore, the fluid which has intruded from a gap between an upper wall surface of the microscope main body and the vertical motion unit protruding from the upper wall surface is received by the water receiver. A discharge path is connected to the water receiver and the fluid received by the water receiver is discharged to an outward through the discharge path. Hence, a pollution caused by fluid is prevented because the fluid having intruded into the microscope main body is discharged before reaching an optical member and a mechanism member.

In an inverted microscope disclosed in Japanese Patent Application Laid-Open No. 2006-162770, a tray which is used for receiving water and has a size larger than a stage is provided between the stage and a main body of the microscope. Therefore, the fluid spilled from the sample and the like is received by this tray. Because the fluid is controlled not to be spilled onto the microscope main body in this manner, an intrusion of fluid into the microscope main body is prevented.

SUMMARY OF THE INVENTION

An inverted microscope according to an aspect of the present invention includes a lens holding mechanism which holds an objective lens arranged under a sample and used to form an observation image of the sample; a focusing mechanism which holds the lens holding mechanism on its upper part and moves the objective lens up and down together with the lens holding mechanism; and a microscope main body which serves as a casing including the focusing mechanism therein, and includes an opening allowing an attachment of the focusing mechanism and the lens holding mechanism in its upper wall surface. A size of the lens holding mechanism in a horizontal plane is larger than a size of an image projected onto the horizontal plane of the opening.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an inverted microscope according to the present invention will be explained in detail below with reference to the accompanying drawings. It should be noted that the present invention is not limited by the embodiments, and that the identical part is assigned with the same symbol in the description throughout the drawings.

Figure 1:
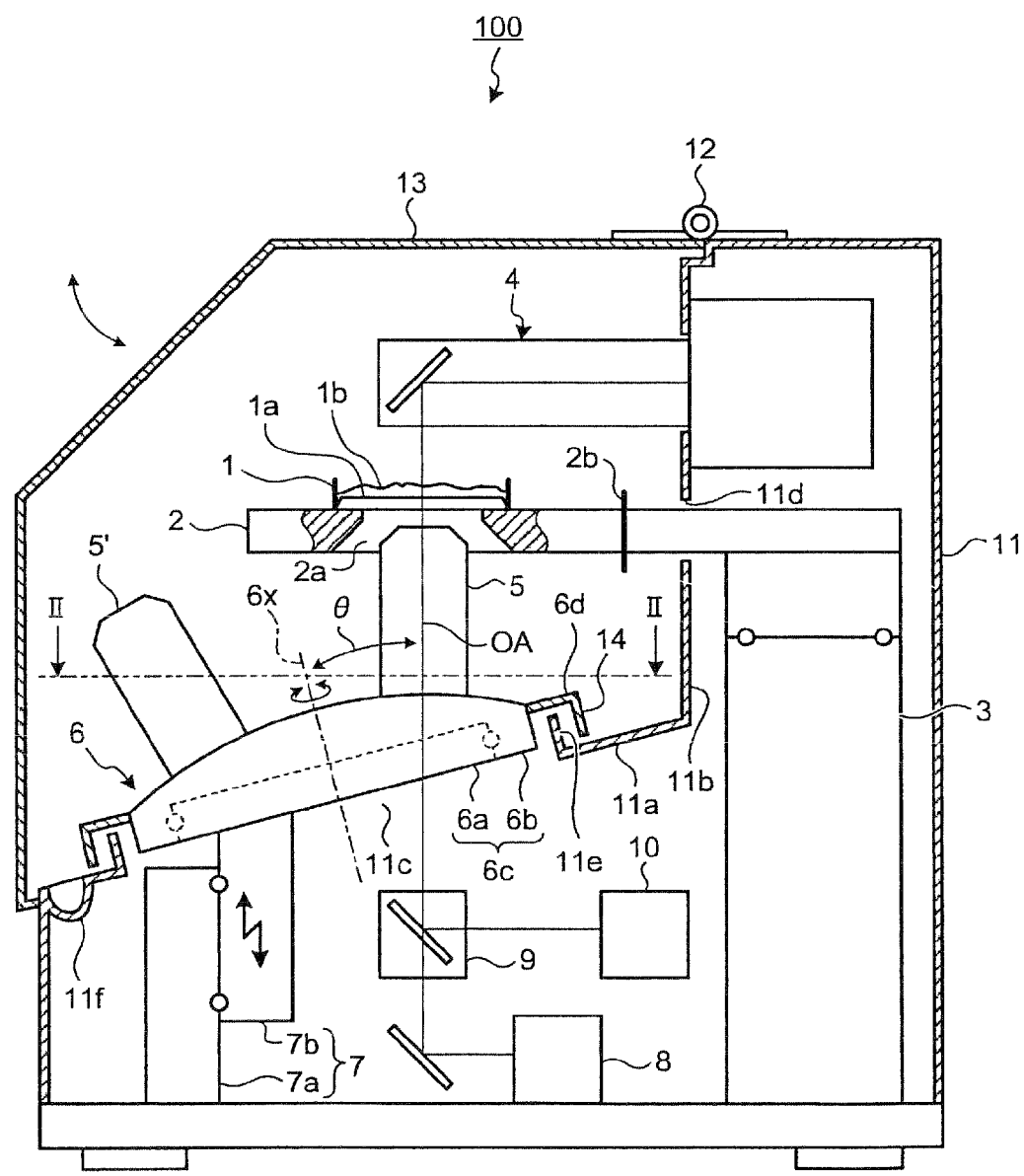
FIG. 1 is a view showing a structure of an inverted microscope according to a first embodiment of the present invention.
Figure 2:
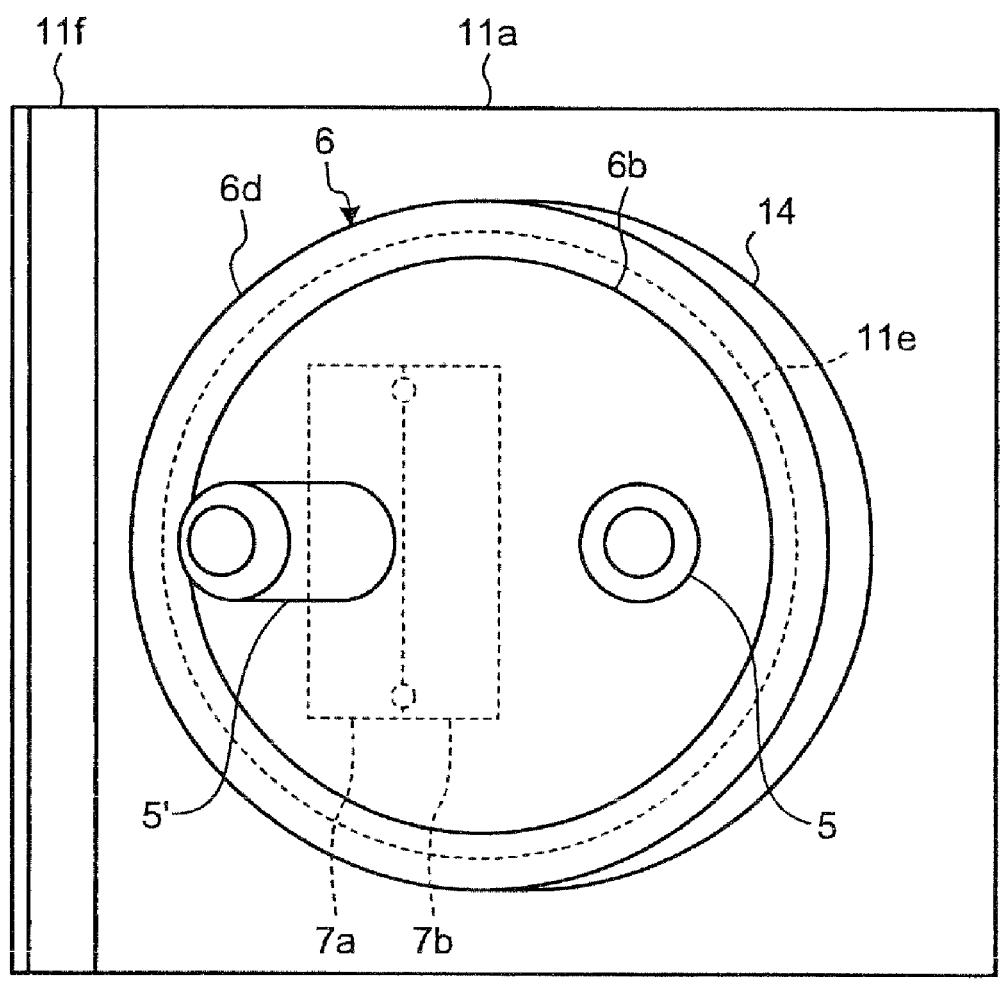
FIG. 2 is a view showing a structure as viewed from a plane shown by II-II in FIG. 1.

First, an inverted microscope according to a first embodiment of the present invention will be explained. FIGS. 1 and 2 show a structure of a substantial part of an inverted microscope 100 according to the first embodiment. FIG. 1 shows a structure of the inverted microscope 100 as viewed from a right side surface and FIG. 2 shows a structure as viewed from a plane shown by II-II in FIG. 1.

As shown in FIGS. 1 and 2, the inverted microscope 100 includes a stage 2, a supporting mechanism 3, a transmitting illumination device 4, an objective lens 5, a lens holding mechanism 6, and a focusing mechanism 7. A container 1 which contains a sample 1a as an observation target and a culture fluid 1b is placed on the stage 2. The supporting mechanism 3 supports the stage 2 so that the stage 2 can move in a horizontal plane (in a plane including a lateral direction and a direction perpendicular to the drawn surface in FIG. 1). The transmitting illumination device 4 transmits an illumination from above of the sample 1a. The objective lens 5 is arranged under the sample 1a. The lens holding mechanism 6 holds the objective lens 5. The focusing mechanism 7 holds the lens holding mechanism 6 on its upper part.

The inverted microscope 100 further includes an incident-light illumination device 8 which irradiates the sample 1a via the objective lens 5 with an excited light, a wavelength selector 9 which makes optical paths respectively for the excited light exposed to the sample 1a and a fluorescence emitted from the sample 1a collectively branch off, an imaging device 10 which captures an observation image, formed by the objective lens 5, of the sample 1a based on the fluorescence emitted from the sample 1a or the transmitting illumination light transmitted from the sample 1a, and a microscope main body 11 which serves as a casing including therein the supporting mechanism 3, the focusing mechanism 7, the incident-light illumination device 8, the wavelength selector 9, and the imaging device 10.

The inverted microscope 100 still further includes a cover 13 which is attached at a front face part (left side surface part in FIG. 1) of the microscope main body 11 with a hinge 12. By using the hinge 12, the cover 13 can be freely opened and closed with respect to the microscope main body 11, and covers the container 1, the stage 2, the transmitting illumination device 4, the objective lens 5, and the lens holding mechanism 6 to block a light from the outside when closed. In other words, the microscope main body 11 and the cover 13 form a dark box when the cover 13 is closed. The cover 13 when closed overlaps a peripheral edge portion of the microscope main body 11, thereby enhancing the function as a dark box.

The lens holding mechanism 6 includes a revolver 6c constituted by using a fixation part 6a fixed on the upper part of the focusing mechanism 7 and a movable part 6b fitted to cover the fixation part 6a. The movable part 6b holds the objective lens 5 so that the objective lens 5 can freely revolve around a revolution axis 6x as a center axis of the fixation part 6a having a cylindrical column shape. The movable part 6b also holds another objective lens 5' whose magnification and the like are different from the objective lens 5, and selectively arranges one of the objective lenses 5 and 5' under the sample 1a. The revolution axis 6x is inclined by an inclination angle θ with respect to an optical axis OA for observing the sample 1a, that is, an optical axis of the objective lens 5 or 5' arranged under the sample 1a, and thereby a bottom surface part of the revolver 6c is inclined by the inclination angle θ from the horizontal plane. The inclination angle θ is expected to be 5° to 30° and more preferably 15°, for example.

The lens holding mechanism 6 integrally includes a protruding edge part 6d and a protective wall part 14, the protruding edge part 6d having an orbicular zone shape and being provided in a manner of protruding from the periphery of the movable part 6b which revolves around the revolution axis 6x, and the protective wall part 14 having a cylindrical shape and being joined to the periphery of the protruding edge part 6d. With the revolver 6c and the protruding edge part 6d, the lens holding mechanism 6 has a larger size in its horizontal plane than an image projected onto a horizontal plane of an opening formed in the microscope main body 11. A magnitude correlation between the opening in the microscope main body 11 and the lens holding mechanism 6 will be separately explained in detail.

The focusing mechanism 7 is constituted by using a fixation part 7a which is provided in a manner of standing on a bottom part of the microscope main body 11 and a movable part 7b which moves up and down along the fixation part 7a, and the fixation part 6a of the revolver 6c is fixed to an upper end part of the movable part 7b. The focusing mechanism 7, to which an interlocking operation mechanism though not shown is connected, makes the movable part 7b move up and down according to an operation of the interlocking operation mechanism, and makes the lens holding mechanism 6 and the objective lenses 5 and 5' integrally move up and down. When the objective lens 5 is arranged under the sample 1a, the objective lens 5 is focused on the sample 1a through the up/down movement operated by the focusing mechanism 7.

The microscope main body 11 is constituted by using an upper wall surface 11a and an upright wall surface 11b in the front face part of the casing structure. The upper wall surface 11a is provided with an opening 11c which allows an attachment of the focusing mechanism 7 and the lens holding mechanism 6, and the upright wall surface 11b is provided with an opening 11d which allows a horizontal protrusion of the stage 2 from the supporting mechanism 3. A protrusion part 11e which protrudes upwards from the upper wall surface 11a in a cylindrical shape is provided in a circumferential part of the opening 11c of the upper wall surface 11a, and a reservoir part 11f is provided at a front end part (left end part in FIGS. 1 and 2) of the upper wall surface 11a.

The upper wall surface 11a is configured to have an inclined plane where the front end part is inclined downwards from a rear end part as a joint part with the upright wall surface 11b as a whole. The upper wall surface 11a as the inclined plane is configured to be perpendicular to the revolution axis 6x of the revolver 6c, parallel to the bottom surface of the revolver 6c, and inclined by the inclination angle θ with respect to the horizontal plane. Here, "being perpendicular to the revolution axis 6x" does not necessarily mean being exactly perpendicular and can be a state of being substantially perpendicular.

The opening 11c is configured to have, along the upper wall surface 11a, a circle shape whose size is larger than that of a contour of the revolver 6c by a predetermined degree. Specifically, the size is configured so that the revolver 6c and the protrusion part 11e do not have direct contact with each other when the revolver 6c is moved up and down by the focusing mechanism 7.

In contrast, the size of the lens holding mechanism 6 which is determined by the revolver 6c and the protruding edge part 6d is configured to be larger than that of the opening 11c along the upper wall surface 11a, and larger in the horizontal plane than the size of an image projected onto the horizontal plane of the opening 11c. This magnitude correlation is always satisfied within a range of the up/down movement when the lens holding mechanism 6 is moved up and down by the focusing mechanism 7.

In such an inverted microscope 100, there is a possibility that the culture fluid 1b is spilled out of the container 1 on the stage 2 by mistake. In this case, the spilt culture fluid 1b falls down onto the lens holding mechanism 6 via a hole 2a provided on the stage 2 for securing a path of an observation light and flows down, along the lens holding mechanism 6, from its periphery, that is, the protective wall 14. Here, the inverted microscope 100 according to the embodiment is configured so that the culture fluid 1b does not fall down directly into the opening 11c, thereby preventing an intrusion of the culture fluid 1b into the opening 11c. At the same time, the culture fluid 1b falling down from the periphery of the stage 2 is prevented from falling down directly into the opening 11c.

Since the protective wall part 14 sharply protrudes downwards, there is no possibility that the culture fluid lb flowing down along the outer side of the protective wall part 14 comes into the inner side thereof.

The protrusion part 11e provided in the circumferential part of the opening 11c protrudes in a direction substantially perpendicular to the upper wall surface 11a, that is, substantially parallel to the revolution axis 6x. On the other hand, the protective wall part 14 is provided substantially parallel to and all around the circumference of the protrusion part 11e, surrounding the protrusion part 11e. The protrusion part 11e and the protective wall part 14 are configured to overlap in a direction along the upper wall surface 11a at least at a part within the range of the up/down movement of the lens holding mechanism 6 operated by the focusing mechanism 7.

In such an inverted microscope 100, there is a possibility that the culture fluid 1b is spilled out of the container 1 on the stage 2 by mistake. In this case, the spilt culture fluid 1b falls down onto the lens holding mechanism 6 via the hole 2a provided on the stage 2, and splashes through the lens holding mechanism 6, the upright wall surface 11b, and the like. Here, the inverted microscope 100 according to the embodiment is configured so that the culture fluid 1b which has fallen down and splashed around does not intrude directly into the opening 11c from a direction along the upper wall surface 11a, thereby preventing the intrusion of the culture fluid 1b into the opening 11c. At the same time, the culture fluid 1b which has fallen down from the periphery of the stage 2 and splashed around is also prevented from intruding directly into the opening 11c from the direction along the upper wall surface 11a.

Specifically, when the inclination angle θ of the revolution axis 6x is 15° and the range of the up/down movement of the lens holding mechanism 6 operated by the focusing mechanism 7 is 10 mm for example, a height of each of the protrusion part 11e and the protective wall part 14 in the direction of the revolution axis 6x is set to 9.7 mm. This setting allows at least a part of the protrusion part 11e and the protective wall part 14 to always overlap in the direction along the upper wall surface 11a within the range of the up/down movement of the lens holding mechanism 6. Besides, by setting a distance between the protrusion part 11e and a side surface as the periphery of the revolver 6c in the direction along the upper wall surface 11a to 2.6 mm or more in this case, a contact between the revolver 6c and the protrusion part 11e within the range of the up/down movement of the lens holding mechanism 6 can always be prevented.

By having the protrusion part 11e in the circumference of the opening 11c, the inverted microscope 100 is configured so that the culture fluid having fallen down onto the upper wall surface 11a does not intrude into the opening 11c through the upper wall surface 11a, thereby preventing the intrusion of the culture fluid 1b into the opening 11c. The spilt culture fluid 1b on the upper wall surface 11a is induced to flow down toward a front end part along the inclined upper wall surface 11a, flow into, and be accumulated in the reservoir part 11f. An operator of the inverted microscope 100 can easily deal with the accumulated culture fluid 1b by wiping or blotting. The inverted microscope 100 can be provided with a discharge path instead of the reservoir part 11f to discharge the culture fluid 1b flowing into the discharge path through the upper wall surface 11a out of the microscope main body 11.

At the same time, the stage 2 is provided with a convex wall part 2b surrounding between the container 1 and the opening 11d along the vertical plane. Thus, the inverted microscope 100 is configured not to allow the intrusion of, for example, the culture fluid 1b spilled onto the stage 2 out of the container 1 into the opening 11d via the stage 2, thereby preventing the intrusion of the culture fluid 1b into the opening 11d.

As described above, it is possible to surely realize a waterproof condition within the microscope main body 11 without allowing the intrusion of fluid such as the culture fluid 1b spilled out of the container 1 on the stage 2 into the microscope main body 11 through the openings 11c and 11d in the inverted microscope 100 according to the first embodiment. Hence, it is possible to prevent the pollution, caused by fluid, of the optical member and the mechanism member provided within the microscope main body 11. Further, the sample 1a and the like dropped by mistake from the stage 2 can be held on the upper wall surface 11a and easily gotten rid of without allowing the intrusion into the microscope main body 11 in the inverted microscope 100.

Figure 3:
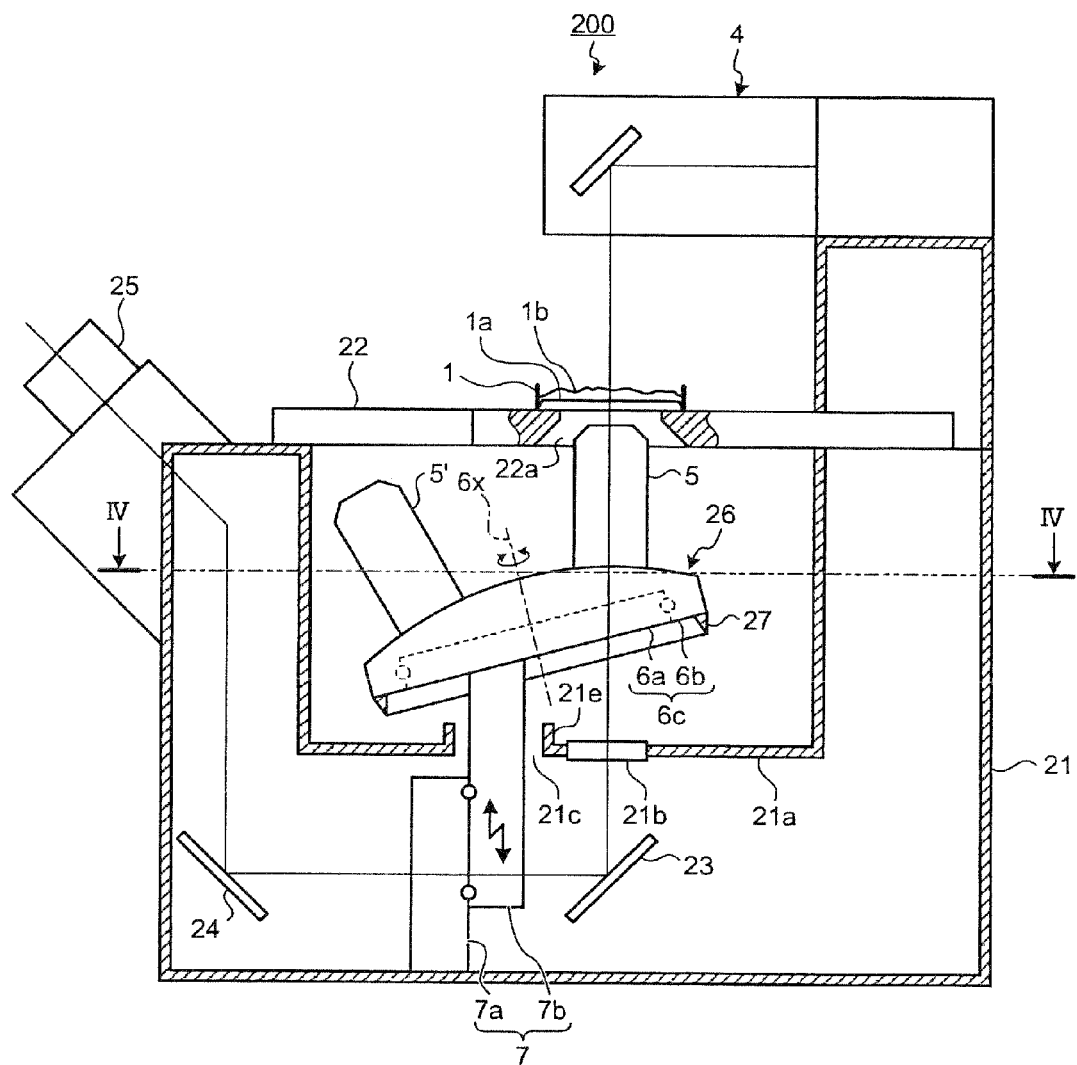
FIG. 3 is a view showing a structure of an inverted microscope according to a second embodiment of the present invention.
Figure 4:
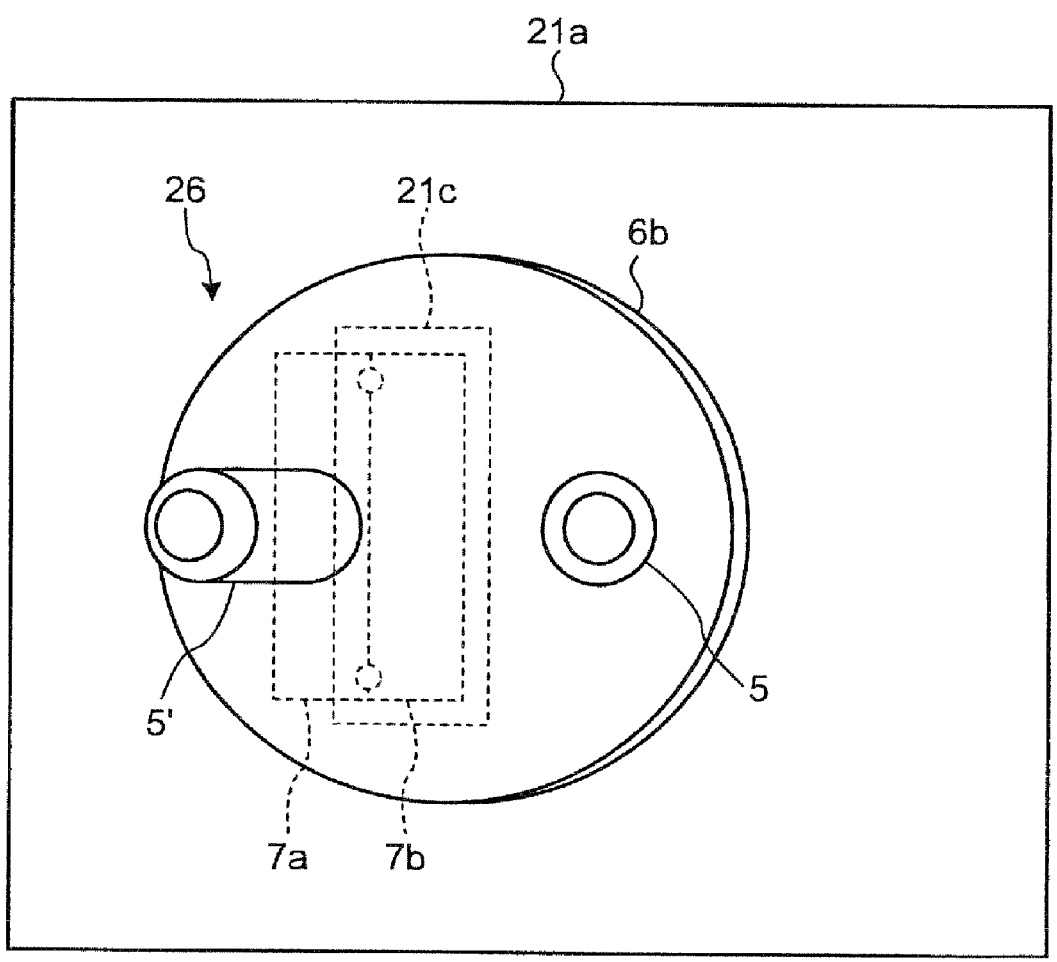
FIG. 4 is a view showing a structure as viewed from a plane shown by IV-IV in FIG. 3.

Next, an inverted microscope according to a second embodiment of the present invention will be explained. FIGS. 3 and 4 show a structure of a substantial part of an inverted microscope 200 according to the second embodiment. FIG. 3 shows a structure of the inverted microscope 200 as viewed from its right side surface, and FIG. 4 shows a structure as viewed from a plane indicated by IV-IV in FIG. 3. It should be noted that the identical part in the inverted microscope 200 to that in the inverted microscope 100 is assigned with the same symbol in the description.

As shown in FIGS. 3 and 4, the inverted microscope 200 includes a stage 22 on which the container 1 is placed, a microscope main body 21 which supports the stage 22, the transmitting illumination device 4, the objective lens 5, a lens holding mechanism 26, and the focusing mechanism 7. The inverted microscope 200 further includes an observation unit 25 which enables visually observing an observation image, formed by the objective lens 5, of the sample 1a based on the transmitting illumination light transmitted from the sample 1a, and mirrors 23 and 24 which form an optical path from the objective lens 5 to the observation unit 25.

The microscope main body 21 is a casing including the focusing mechanism 7 and the mirrors 23 and 24 therein, and an upper wall surface 21a of the microscope main body 21 is provided with an opening 21c which allows attaching the focusing mechanism 7 and the lens holding mechanism 26. The upper wall surface 21a is further provided with a glass window 21b which forms a sealed introduction entrance introducing an observation light from the sample 1a via the objective lens 5 into the microscope main body 21, and with a protrusion part 21e protruding upwards from the upper wall surface 21a in a cylindrical shape in the circumference of the opening 21c in the upper wall surface 21a.

The lens holding mechanism 26 is constituted by using the revolver 6c and provided with a protrusion part 27 protruding downwards in a ring shape around the revolution axis 6x in the periphery part of the revolver 6c. A size of the revolver 6c in the horizontal plane (in the plane including the lateral direction and the direction perpendicular to the drawn surface in FIG. 3) is larger than the size of an image projected onto the horizontal plane of the opening 21c, that is, the opening 21c itself, and the protrusion part 27 is provided in an outer side of the opening 21c in the horizontal direction.

In such an inverted microscope 200, there is a possibility that the culture fluid lb is spilled out of the container 1 on the stage 22. In this case, the spilt culture fluid 1b falls down onto the lens holding mechanism 26 via a hole 22a provided on the stage 22 for securing a path of an observation light and flows down, along the lens holding mechanism 26, from its periphery. Here, the inverted microscope 200 according to the embodiment is configured so that the culture fluid lb does not fall down directly into the opening 21c, thereby preventing the intrusion of the culture fluid 1*b* into the opening 21*c*. Since the protrusion part 27 sharply protrudes downwards, there is no possibility that the culture fluid 1*b* flowing down along the outer side of the protrusion part 27 comes into the inner side (a side of the revolution axis 6*x*).

By having the protrusion part 21*e* in the circumference of the opening 21*c*, the inverted microscope 200 is configured so that the culture fluid 1*b* having fallen down onto the upper wall surface 21*a* does not intrude into the opening 21*c* through the upper wall surface 21*a*, thereby preventing the intrusion of the culture fluid 1*b* into the opening 21*c*. The spilt culture fluid 1*b* on the upper wall surface 21*a* is retained on the upper wall surface 21*a* or discharged to the outside of the microscope main body 21 through the upper wall surface 21*a*.

As described above, it is possible to surely realize a waterproof condition within the microscope main body 21 without allowing the intrusion of fluid such as the culture fluid 1*b* spilled out of the container 1 on the stage 22 into the microscope main body 21 through the opening 21*c* in the inverted microscope 200 according to the second embodiment. Hence, it is possible to prevent the pollution, caused by fluid, of the optical member and the mechanism member provided within the microscope main body 21.

Figure 5:
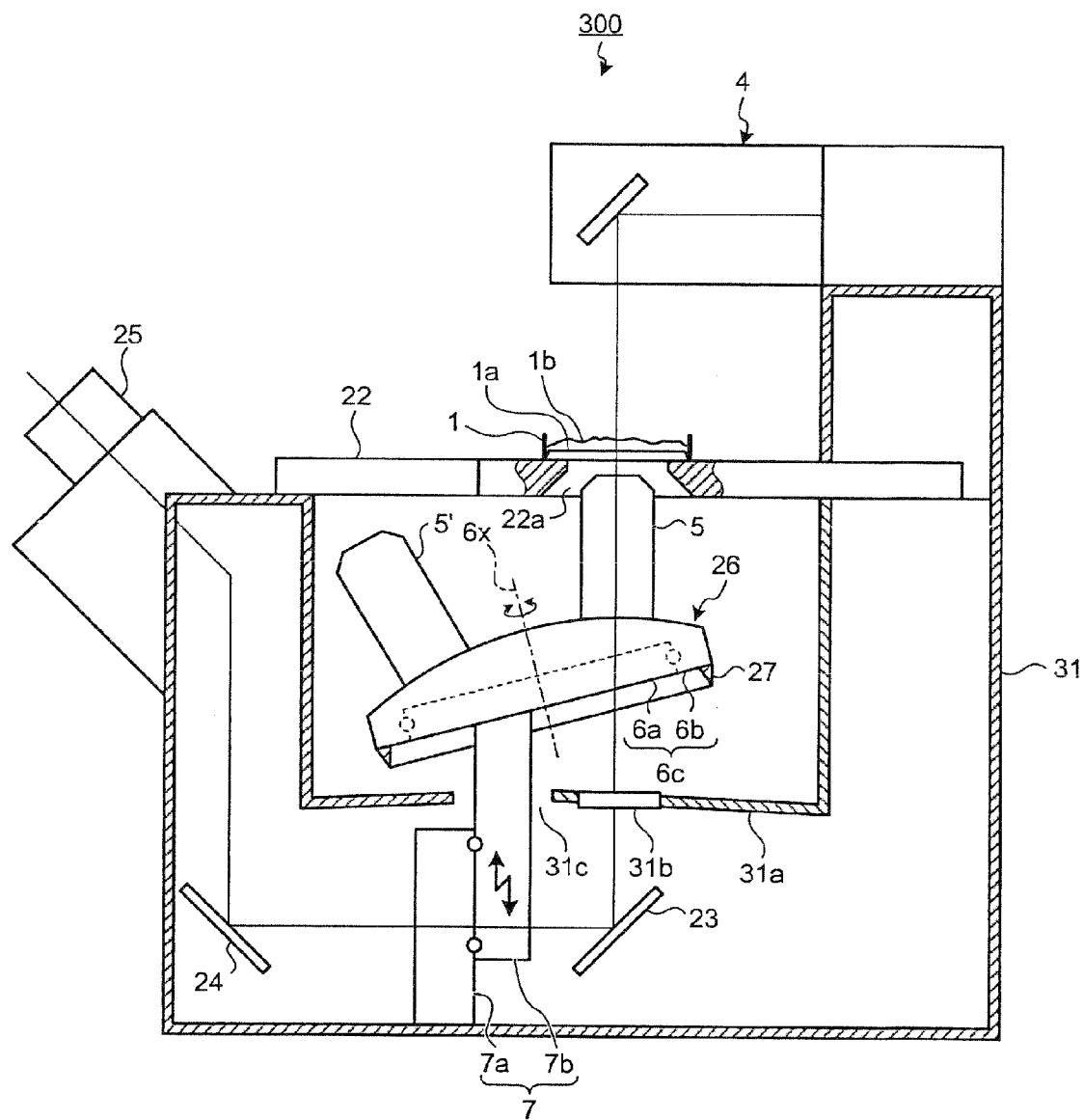
FIG. 5 is a view showing a structure of an inverted microscope according to a modification of the second embodiment.

Next, a modification of the inverted microscope according to the second embodiment will be explained. FIG. 5 shows a structure of a substantial part of an inverted microscope 300 according to the modification. As shown in FIG. 5, the inverted microscope 300 includes a microscope main body 31 instead of the microscope main body 21 based on the structure of the inverted microscope 200. The structure except for the microscope main body 31 in the inverted microscope 300 is the same as that in the inverted microscope 200, and the identical part is assigned with the same symbol in the description.

The microscope main body 31 is a casing including the focusing mechanism 7 and the mirrors 23 and 24 therein, and an upper wall surface 31*a* of the microscope main body 31 is provided with an opening 31*c* which allows attaching the focusing mechanism 7 and the lens holding mechanism 26. The opening 31*c* is configured to have the same size as the opening 21*c* in the microscope main body 21. The upper wall surface 31*a* is further provided with a glass window 31*b* similarly to the glass window 21*b* in the microscope main body 21. The glass window 31*b* forms a sealed introduction entrance which introduces an observation light from the sample 1*a* via the objective lens 5 into the microscope main body 31. Besides, the upper wall surface 31*a* is configured to have an inclined plane where a front end part and a rear end part are inclined downwards from the opening 31*c* which is located at a level higher than the front and the rear end parts.

In such an inverted microscope 300, there is a possibility that the culture fluid 1*b* is spilled out of the container 1 on the stage 22 by mistake. In this case, the spilt culture fluid 1*b* falls down onto the lens holding mechanism 26 via the hole 22*a* provided on the stage 22 and flows down, along the lens holding mechanism 26, from its periphery. Here, the inverted microscope 300 according to the modification is configured so that the culture fluid 1*b* does not fall down directly into the opening 31*c* similarly to the inverted microscope 200, thereby preventing the intrusion of the culture fluid 1*b* into the opening 31*c*.

Furthermore, since the upper wall surface 31*a* in the inverted microscope 300 has the inclined plane where the opening 31*c* is positioned at the highest level, the culture fluid 1*b* having fallen down onto the upper wall surface 31*a* is configured not to come into the opening 31*c* along the upper wall surface 31*a*. Thus, the intrusion of the culture fluid 1*b* into the opening 31*c* is prevented. The culture fluid having fallen down onto the upper wall surface 31*a* is induced to flow down to the front end part or the rear end part along the inclined upper wall surface 31*a*, and retained on the upper wall surface 31*a* or discharged to the outside of the microscope main body 31 along the upper wall surface 31*a*.

As described above, it is possible to surely realize a waterproof condition within the microscope main body 31 without allowing the intrusion of fluid such as the culture fluid 1*b* spilled out of the container 1 on the stage 22 into the microscope main body 31 through the opening 31*c* in the inverted microscope 300 according to the modification. Hence, it is possible to prevent the pollution, caused by fluid, of the optical member and the mechanism member provided within the microscope main body 31.

Exemplary embodiments of the present invention are explained as the first and the second embodiments above. However, the present invention is not limited to the first and the second embodiments and various modifications may be made without departing from the spirit or scope of the present invention.

For example, the upper wall surfaces 11*a* and 31*a* in the inverted microscopes 100 and 300 are wholly inclined surfaces respectively in the description. However, the upper wall surfaces 11*a* and 31*a* may be partially inclined at a particular location where the culture fluid 1*b* is often spilled. Besides, the upper wall surfaces 11*a* and 31*a* are configured to have the plane inclined in a front-back direction. However, the direction is not limited to the front-back direction, and the upper wall surface may be a plane inclined in a left-right direction for example. Furthermore, the direction is not limited to the front-back direction or the left-right direction, and the upper wall surface may be provided with planes inclined in more directions, for example, four planes inclined in front, back, left, and right directions.

In the inverted microscopes 200 and 300 described above, the protrusion part 27 is provided in a manner of protruding in the periphery part of the revolver 6*c*. However, the periphery on the bottom surface of the revolver 6*c* may be formed to have a protruding shape, for example, instead of the protrusion part 27.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents

What is claimed is:

1. An inverted microscope comprising:
a lens holding mechanism which includes a fixation part and a movable part fitted to cover the fixation part, wherein the movable part holds an objective lens so that the objective lens can revolve around a predetermined axis, and wherein the objective lens is arranged under a stage on which a sample can be placed;
a focusing mechanism which holds the fixation part of the lens holding mechanism at an upper part of the focusing mechanism, and which moves the objective lens up and down together with the lens holding mechanism,
a microscope main body which serves as a casing including the focusing mechanism therein, and which includes an opening through which the focusing mechanism and the lens holding mechanism are connected, wherein the opening is provided in an upper wall surface of the microscope main body; and a blockage member which is provided so as to be revolvable together with the movable part, and which blocks an intrusion of fluid spilled onto the lens holding mechanism into the opening, wherein a size of the lens holding mechanism and the blockage member projected onto a horizontal plane is larger than a size of the opening projected onto the horizontal plane.

2. The inverted microscope according to claim 1, wherein the upper wall surface has an inclined plane which enables fluid spilled onto the upper wall surface to flow down toward a predetermined location except for the opening.

3. The inverted microscope according to claim 2, wherein the microscope main body includes at least one of a reservoir part and a discharge path, the reservoir part accumulating fluid which is spilled onto the upper wall surface and induced to flow down via the inclined plane, and the discharge path discharging the fluid.

4. The inverted microscope according to claim 1, wherein the microscope main body includes a protrusion part protruding upwards from the upper wall surface in a circumference of the opening.

5. The inverted microscope according to claim 4, wherein the blockage member provided on the movable part of the lens holding mechanism includes a surrounding part which is provided integrally with the lens holding mechanism and surrounds the protrusion part.

6. The inverted microscope according to claim 1, wherein:
the upper wall surface has an inclined plane which is substantially perpendicular to the predetermined axis around the opening, and
the microscope main body includes a protrusion part protruding upwards from the upper wall surface in a circumference of the opening.

7. The inverted microscope according to claim 6, wherein the blockage member provided on the movable part of the lens holding mechanism includes a surrounding part which is provided integrally with the lens holding mechanism and surrounds the protrusion part.

8. The inverted microscope according to claim 6, wherein the microscope main body includes at least one of a reservoir part and a discharge path, the reservoir part accumulating fluid which is spilled onto the upper wall surface and induced to flow down via the inclined plane, and the discharge path discharging the fluid.

9. The inverted microscope according to claim 1, wherein the blockage member is provided in a periphery part of the movable part around the predetermined axis.

10. The inverted microscope according to claim 1, further comprising:
a stage supporting mechanism which is provided in the microscope main body, supports the stage, and makes the stage horizontally protrude from an opening which is dedicated to the stage and formed in the microscope main body; and
a stage blockage member which is provided on the stage and blocks an intrusion of fluid spilled onto the stage into the opening dedicated to the stage.

* * * * *